Aug. 10, 1926.  
H. O. C. ISENBERG  
1,595,196  
PROCESS FOR PRODUCING SULPHUR DIOXIDE AND APPARATUS THEREFOR  
Filed Dec. 22, 1924  2 Sheets-Sheet 1
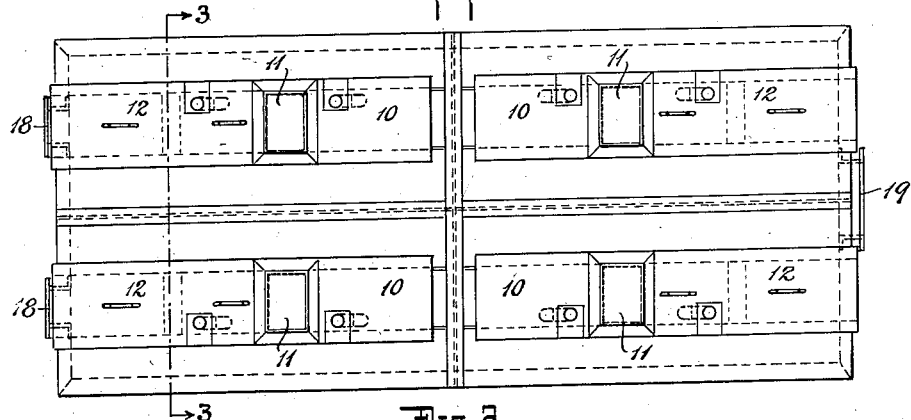
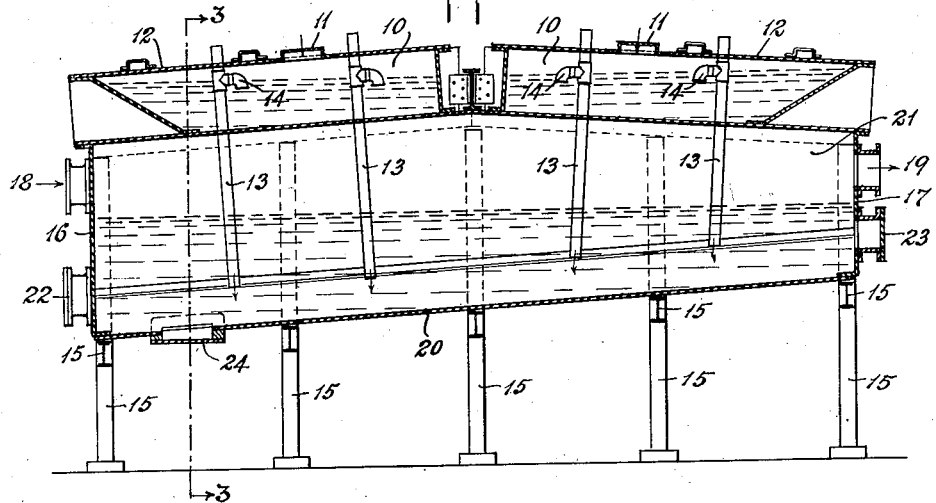
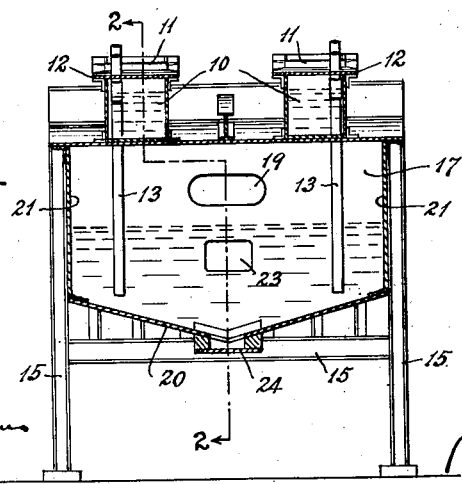
WITNESS
INVENTOR
HANS O. C. ISENBERG
BY
ATTORNEYS Aug. 10, 1926.
H. O. C. ISENBERG
1,595,196
PROCESS FOR PRODUCING SULPHUR DIOXIDE AND APPARATUS THEREFOR
Filed Dec. 22, 1924     2 Sheets-Sheet 2
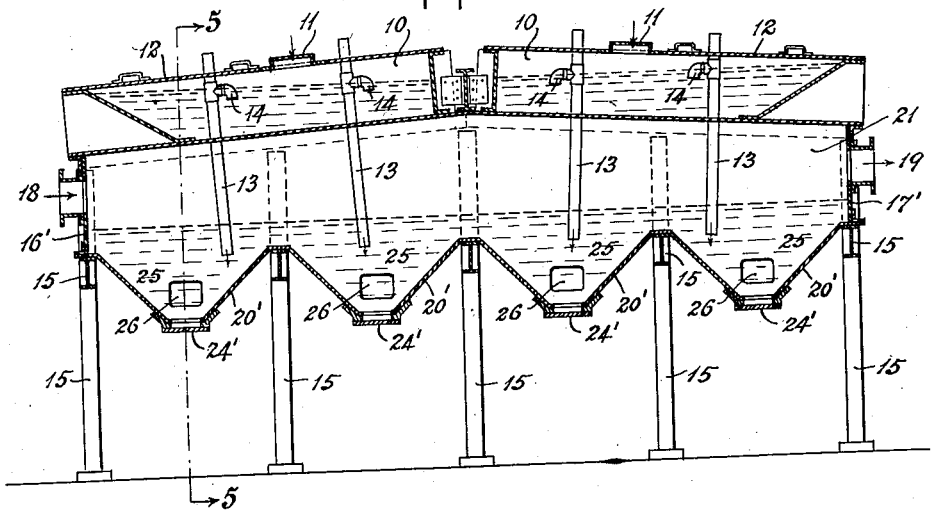
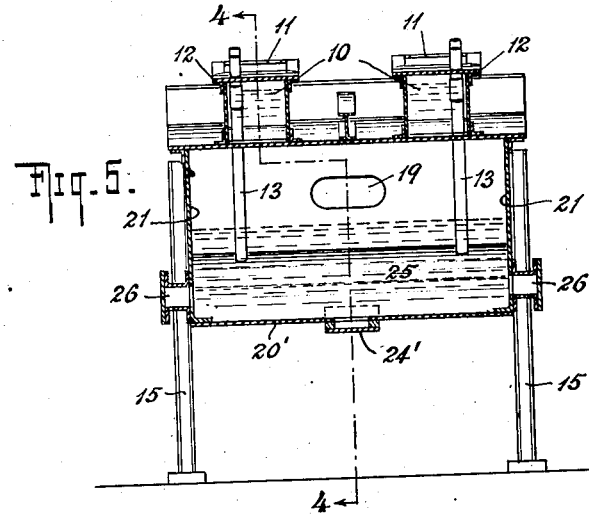
WITNESS
*G. V. Rasmussen*
INVENTOR
HANS O. C. ISENBERG
BY
*Niesen Schenck*
ATTORNEYS Patented Aug. 10, 1926.

1,595,196

UNITED STATES PATENT OFFICE.

HANS O. C. ISENBERG, OF GARDEN CITY, NEW YORK, ASSIGNOR TO GENERAL CHEMICAL COMPANY, OF NEW YORK, N. Y., A CORPORATION OF NEW YORK.

PROCESS FOR PRODUCING SULPHUR DIOXIDE AND APPARATUS THEREFOR.

Application filed December 22, 1924. Serial No. 757,313.

My invention relates to sulphur burners, and has for its object to facilitate the separation of impurities contained in the raw sulphur, so that the sulphur dioxide gas resulting from the burning operation may be obtained in a state of great purity. The improved sulphur burner may be operated either under pressure, that is under conditions creating an internal pressure greater than atmospheric pressure, or such burner may be operated under suction, in which case the internal pressure will be below atmospheric pressure.

Two satisfactory examples of my invention are illustrated by the accompanying drawings, in which Fig. 1 is a plan view showing one embodiment of my improved sulphur burner; Fig. 2 is a longitudinal vertical section taken on line 2—2 of Fig. 3; Fig. 3 is a vertical cross-section on line 3—3 of Figs. 1 and 2; and Figs. 4 and 5 are views corresponding to Figs. 2 and 3 respectively, but showing another embodiment of my invention.

I will first describe those portions of the sulphur burner which are alike in both constructions illustrated. At the top of the apparatus are located the melting vessels 10, which number four in the particular embodiment shown, arranged in two pairs, the two vessels 10 of the same pair being disposed in the same longitudinal plane, and inclined upwardly from the ends of the apparatus toward the middle, so that the vessels of the same pair are highest at their adjacent ends. The vessels are provided at their upper portions with individual filling openings, normally closed by covers 11. Furthermore, these vessels are provided at their outer or lower portions, with longitudinally slidable or otherwise removable cover sections 12, to afford access to the contents of the vessel, when desired, even during the operation of the burner, so that the impurities that have collected at the bottom of the vessels 10 may be removed from any one or more of them, while the burner is operating. These impurities are generally in the nature of a thick mud, and may be readily scraped off the bottom of the vessels 10, and lifted out therefrom, after removing the respective cover sections 12. At different points of the length of each vessel 10, I have shown pipes 13 provided with elbows 14 which dip into the molten sulphur contained in the vessels 10, and these pipes 13 extend downwardly (preferably inclined) to discharge the molten sulphur into the main burner chamber, as set forth below. At 15 I have indicated a suitable frame or standards to support the apparatus. Directly under the melting vessels 11 is arranged the main chamber having end walls 16 and 17, one of which is provided with one or more air inlets 18, while the other is apertured for the exit of sulphur dioxide gases (mixed with air, etc.), as indicated at 19. Fig. 1 shows a single centrally located outlet 19 and two lateral air inlets 18, but I do not wish to restrict myself to this.

The two constructions illustrated differ as to the lower portion of the main burner chamber. In Figs. 2 and 3, this chamber has a bottom 20 inclined downward transversely (Fig. 3) from the side walls 21 of the chamber to its longitudinal center, and also inclined downwardly from the end wall 17 to the opposite end wall 16. These end walls are also provided, below the level of the molten sulphur, with clean-out doors 22 and 23 respectively, and another clean-out door 24 may be located in the bottom 20, preferably near the end wall 16. It will be understood that the openings 18, 19 are located above the surface of the body of molten sulphur contained in the main burner chamber. This latter remark will apply to both forms of my invention illustrated herein.

In the construction shown in Figs. 4 and 5, the end walls 16', 17' are of equal height, such height being less than that of the end walls 16, 17. No clean-out doors have been shown in the walls 16', 17'. The bottom of the main burner chamber consists of a series of transverse walls 20' inclined alternately in opposite directions to form downwardly-contracting pockets 25. At the central portions of these pockets, I have shown clean-out doors 24', and at the sides of the pockets, in the side walls 21', I have indicated cleanout doors 26.

When the burner is to be operated under pressure, air under a pressure greater than atmospheric is forced in through the inlets 18 by a blower (not shown) or in any other suitable manner. The gases (largely sulphur dioxide) produced in the main burner chamber pass out at 19. When the burner is to be operated under a partial vacuum, the outlet 19 is connected with a suction device (not shown) of any well-known or approved character, so that the pressure in the main burner chamber will be below atmospheric, and air will be drawn in through the inlets 18.

It will be understood that the heat produced by the burning of the sulphur in the main burner chamber will melt the raw sulphur (brimstone) introduced into the upper vessels 10 through the openings normally closed by the covers 11. As the molten sulphur in these upper vessels is in a quiescent state, time and opportunity is given for a large portion of the impurities to settle in these vessels, particularly at their outer or lower ends. These impurities may be removed, without interrupting the operation, by uncovering the openings normally closed by the removable sections 12, and withdrawing such impurities through these openings. The molten sulphur, purified as explained, passes through the elbows 14 and pipes 13 into the lower portion of the main chamber. Here the sulphur from the several upper vessels forms a single continuous body of molten sulphur, which is ignited and burned in any suitable manner. The fact that the bottom of the main chamber is inclined (either continuously from end to end, as in Fig. 2, or alternately in opposite directions, as in Fig. 4) promotes the deposit of a further amount of impurities, so that the burning surface layer of sulphur is of great purity, resulting in a corresponding purity of the $SO_2$ gases passing out at 19.

It will be understood that the melting vessels form a closed top or roof for the main burner chamber, and that the latter, under normal operating conditions, is closed with the exception of the openings 18, 19.

Impurities deposited in the main burner chamber may be removed by opening the clean-out doors 22, 23 or 26, while the bottom openings normally closed by the doors 24 or 24' will generally be used for the removal of all the sulphur and impurities from the main burner chamber.

The overflow pipes 13 should be of sufficient length so that the height of the column of molten sulphur in them will be able to overcome the pressure in the main burner chamber, when the apparatus is operated under a pressure greater than atmospheric.

It will be observed that the arrangement is such as to enable substantial quantities of such impurities as arsenic as may be present in the brimstone material to be settled out and eliminated in the top and in the bottom chambers without interruption of the process and in such manner that the precipitated impurities do not appear in the burner gases. The burner gases are consequently in a state of relatively great purity as contrasted with burner gases obtained from brimstone when burned in apparatus and under conditions which do not apply the principles of this invention. Particularly when the burner gases are intended for subsequent catalytic treatment to convert their $SO_2$ content into $SO_3$, the removal of the impurities, and especially arsenic, is of great importance, it being well known that arsenic and certain other impurities interfere very materially with the yield of the catalytic reaction and have a tendency to weaken and poison, as it were, the substances employed as catalysts. Arsenic occurs rather frequently as an impurity associated with brimstone, and even high-grade Louisiana brimstone occasionally becomes contaminated with arsenic. The impurities will, of course, be removed periodically, and in this manner I am enabled to preserve purity of a certain degree in the molten supply of the upper vessels 10 as well as in the molten pool in the main burner chamber.

Various modifications may be made without departing from the nature of my invention as defined in the appended claims.

I claim:

1. The process of producing $SO_2$ gas which comprises preliminary liquefaction of brimstone, feeding a burner from said liquefied supply by transferring upper layers of the liquefied supply to the burner, causing gravity-induced separation of impurities in said supply as well as in the liquid brimstone in the burner and periodically withdrawing from lower parts of the supply as well as of the brimstone in the burner, liquid brimstone in which impurities have settled.

2. The process of producing $SO_2$ gas which comprises preliminary liquefaction of brimstone in a relatively undisturbed pool, maintaining a relatively constant level in said pool by the addition of fresh supplies of brimstone, feeding a burner from said liquefied supply by transferring upper layers from the pool to the burner, causing gravity-induced separation of impurities in said supply as well as in the liquefield brimstone in the burner and periodically withdrawing from lower parts of the pool as well as of the brimstone in the burner, liquid brimstone in which impurities have settled.

3. The process of producing $SO_2$ gas which comprises preliminary liquefaction of brimstone, transferring liquid brimstone from upper layers of the liquefied supply to a lower part of the liquid brimstone in the burner, causing gravity-induced separation of impurites in said supply as well as in the liquid brimstone in the burner and periodically withdrawing from lower parts of the supply as well as of the brimstone in the burner liquid brimstone in which impurities have settled.

4. That improvement in the process of burning sulphur which comprises maintaining a supply of liquefied sulphur, feeding a burner from said liquid supply by transferring upper layers of the supply to the burner, maintaining a mass of liquid sulphur in said burner, and withdrawing portions of liquid sulphur from the sulphur in the burner and from the lower layers of the sulphur in the supply so as to remove impurities which have settled at the bottom of the supply.

5. That improvement in the process of burning sulphur which comprises maintaining a supply of liquefied sulphur, feeding a burner from said liquid supply by transferring upper layers of the supply to the burner, maintaining a mass of liquid sulphur in said burner, and withdrawing sulphur from the lower portions of the sulphur in the burner and from the lower layers of the sulphur in the supply so as to remove impurities which have settled at the lower portions of the sulphur both in the supply and in the burner.

6. That improvement in the process of burning sulphur which comprises maintaining a supply of liquefied sulphur, feeding a burner from said liquid supply by transferring upper layers of the supply to the burner, maintaining a mass of liquid sulphur in said burner, and withdrawing sulphur from the lower layers of the sulphur in the burner so as to remove impurities which have settled at the bottom of the burner.

7. A sulphur burner comprising a casing forming a main burner chamber, a plurality of separate melting vessels located above said chamber, and means for transferring molten sulphur from said vessels to said chamber to form a continuous body of molten sulphur therein.

8. That improvement in the process of burning sulphur which comprises maintaining a supply of liquefied sulphur, feeding a burner from said liquid supply by transferring upper layers of the supply to the burner while maintaining the sulphur supply in heat-transfer relation to the burner, maintaining a mass of liquid sulphur in said burner, and withdrawing portions of liquid sulphur from the sulphur in the burner and from the lower layers of the sulphur in the supply so as to remove impurities which have settled at the bottom of the supply.

9. A sulphur burner comprising a casing forming a main burner chamber, a plurality of melting vessels located above said chamber and having their bottoms inclined longitudinally in opposite directions, with arrangements for the removal of impurities from said vessels adjacent to the lower ends of their inclined bottoms, and means for transferring molten sulphur from said vessels to said chamber.

10. An apparatus for burning sulphur, comprising the combination of means for maintaining a supply of molten sulphur, a sulphur burner adapted to contain a supply of molten sulphur, means for transferring upper layers of said supply to said burner, means for withdrawing portions of the molten sulphur from the burner, and means permitting removal of sulphur from the lower layers of the sulphur in the supply.

11. An apparatus for burning sulphur, comprising the combination of means for maintaining a supply of molten sulphur, a sulphur burner adapted to contain a supply of molten sulphur, means for transferring upper layers of said supply to said burner, means for withdrawing portions of molten sulphur from the lower portion of said burner, and means permitting withdrawal of liquid sulphur from the lower layers of the sulphur in the supply.

12. A sulphur burner comprising a casing forming a main burner chamber having openings for the admission of air and the exit of hot gases respectively, the bottom of said chamber being inclined alternately in opposite directions, a melting vessel located above said chamber, and means for transferring molten sulphur from said vessel to said chamber.

13. An apparatus for burning sulphur, comprising the combination of means for maintaining a supply of molten sulphur, a sulphur burner adapted to contain a supply of molten sulphur, means for transferring upper layers of said supply to said burner, and means for withdrawing portions of molten sulphur from the lower layers of the sulphur in said burner.

14. An apparatus for burning sulphur, comprising the combination of means for maintaining a supply of molten sulphur, a sulphur burner adapted to contain a body or pool of molten sulphur, means for transferring upper layers of said supply to said burner while maintaining the sulphur supply in heat-transfer relation to the burner, means for withdrawing portions of molten sulphur from said pool, and means permitting removal of sulphur from the lower layers of the sulphur in the supply.

15. In a sulphur burner, the combination of a casing forming a main burner chamber and having an inclined bottom and an outlet at its lower portion for the removal of impurities, and pipes for supplying molten sulphur to said burner chamber, said pipes terminating above said outlets.

16. In a sulphur burner, the combination of a casing forming a main burner chamber and provided with a bottom shaped to form a plurality of settling chambers, with separate outlets for each chamber, and pipes for supplying molten sulphur to said chamber, the outlets of said pipes being located directly above such settling chambers.

In testimony whereof I have hereunto set my hand.

HANS O. C. ISENBERG.